(12) United States Patent
Yi et al.

(10) Patent No.: US 12,037,293 B2
(45) Date of Patent: Jul. 16, 2024

(54) LAMINATED CERMET TOOL MATERIAL WITH SURFACE SELF GENERATED MICRO TEXTURE AND ITS PREPARATION METHOD

(71) Applicant: Qilu University of Technology, Jinan (CN)

(72) Inventors: Mingdong Yi, Jinan (CN); Jianping Wang, Jinan (CN); Chonghai Xu, Jinan (CN); Zhaoqiang Chen, Jinan (CN); Guangchun Xiao, Jinan (CN)

(73) Assignee: Qilu University of Technology, Jinan (CN)

( * ) Notice: Subject to any disclaimer, the term of this patent is extended or adjusted under 35 U.S.C. 154(b) by 0 days.

(21) Appl. No.: 18/317,452

(22) Filed: May 15, 2023

(65) Prior Publication Data
US 2023/0416161 A1 Dec. 28, 2023

(51) Int. Cl.
*C04B 35/80* (2006.01)
(52) U.S. Cl.
CPC .................................... *C04B 35/80* (2013.01)
(58) Field of Classification Search
CPC . C04B 35/80; C04B 41/5098; C04B 41/4584; C04B 41/009; B22F 2998/10; B22F 2005/002; B22F 3/105; C22C 29/06
USPC ...................................................... 428/292.1
See application file for complete search history.

(56) References Cited

U.S. PATENT DOCUMENTS

| 5,855,997 A | 1/1999 | Amateau |
| 2016/0375593 A1 | 12/2016 | Adams et al. |

FOREIGN PATENT DOCUMENTS

| CN | 101224990 A | 7/2008 |
| CN | 1101531536 A | 9/2009 |
| CN | 104328478 A | 2/2015 |

OTHER PUBLICATIONS

Yingjie Song "Design and synthesis of a novel ceramic coating-like tool material" Ceramic International 47, 4206-16. Oct. 2, 2020.
Zhiyong Wang "Microstructure and mechanical properties of (Ti,W)C cermets prepared by ultrafast spark plasma sintering" Ceramic International 47, 15613-21, Feb. 16, 2020.

*Primary Examiner* — Camie S Thompson
(74) *Attorney, Agent, or Firm* — CBM PATENT CONSULTING, LLC

(57) ABSTRACT

A laminated cermet tool material with self generated micro texture on the surface and a preparation method thereof; first, the tungsten carbide titanium matrix powder is added with molybdenum cobalt nickel rare metal as the bonding phase to form the matrix, then 2.5D braided ceramic fiber preforms are placed on the upper and lower surfaces of the cermet matrix powder, and the laminated cermet tool material with self generated micro texture on the surface is obtained by spark plasma sintering, as the ceramic fiber braid is braided, it has a stable structure, realizing the formation of texture coating on the surface of the tool, and the laminated tool with the cermet as the middle layer.

7 Claims, 1 Drawing Sheet

LAMINATED CERMET TOOL MATERIAL WITH SURFACE SELF GENERATED MICRO TEXTURE AND ITS PREPARATION METHOD

CROSS-REFERENCE TO RELATED APPLICATIONS

This application claims priority to Chinese Patent Application Ser. No. CN2022107126151 filed on 22 Jun. 2022.

TECHNICAL FIELD

The invention relates to a laminated cermet tool material with surface self-generated microtexture and a preparation method thereof.

BACKGROUND TECHNIQUE

Traditional tools commonly used materials for high-speed steel, hard alloy, ceramic tools and other materials, the tools prepared by these materials have obvious defects, either high hardness and low toughness, or high toughness and low hardness, cermet is composed of metal and ceramic composite material according to a certain ratio, taking into account the high hardness of ceramics, hard alloy high toughness, high strength and other characteristics, It is more suitable for processing difficult-to-process materials, and becomes the preferred material for new tool materials instead of traditional tool materials, which can greatly improve production efficiency.

With the development of modern industry, more and more new materials are used in aerospace, automobile, mold and other industries, and the difficulty of cutting is increasing. Micro-texture is formed on the surface of the tool, which can obtain better comprehensive cutting performance than the traditional homogeneous tool, so as to meet the requirements of modern cutting. The surface texture is a lattice of patterns such as pits/dents or bumps with a certain size and arrangement. Compared with the non-woven tool, the woven tool can greatly reduce the friction coefficient of the tool front, improve the tool life, effectively improve the machining efficiency, improve the machining accuracy and improve the surface quality. In addition, texture tools can also reduce the use of coolant, conducive to environmental protection, but the current texture tools are generally high cost. In recent years, a variety of new micro-texture tools emerge in an endless flow. For example, Chinese patent document CN 110695383A provides a kind of micro texture coating tool which uses femtosecond laser technology to process the texture forming depth gradient change on the rear cutter face of the carbide tool. During processing, the lubricant will be stored in the micro texture unit, and can play the role of cooling and lubricating along the micro texture to the cutting edge. The tool also has good coating adhesion and friction and wear performance, and has a long service life.

For example, the Chinese patent document CN110744201A disclosed a preparation method of micro texture tool and micro texture tool, including the following steps: S1: after cleaning the tool to be processed, take it out and dry, and use femtosecond laser to treat the processing tool for processing; S2: Adjust the auxiliary positioning light source of femtosecond laser, locate the position of the tool to be machined, and process the micro-texture array structure on the tool to be machined by adjusting the position of the tool to be machined in the process of machining the tool; S3: Put the processed micro texture tool into the hard film coating machine, deposit the coating on the substrate surface, and prepare the micro texture tool with the coating; S4: The mixture of compressed gas and lubricant is vaporized to form micron droplets, which are then sprayed to the processing zone for lubrication; However, the formation of most micro-texturing tools depends on femtosecond laser technology, which is difficult and costly. In addition, most of the tool base materials are high speed steel or hard steel, there is no report on the texture treatment of cermet tool surface.

Therefore, it is urgent to develop a cermet tool which can generate micro-texture on the surface of cermet tool.

SUMMARY OF INVENTION

Aiming at the deficiency of the prior art, the invention provides a laminated cermet tool material with self-generated micro-texture on the surface and a preparation method thereof. The surface of the laminated cermet tool material has self-generated micro-texture, high hardness, high strength and good tool life.

The invention firstly proposes to use ceramic fiber braided body to self-generate micro-texture on the surface of cermet cutting tool. In order to solve the problem that the ceramic fiber braided body and substrate are difficult to combine, the invention uses the metal phase in the cermet cutting tool material to form a bonding phase in the sintering process through the discharge plasma sintering technology, and effectively solves the problem that the ceramic fiber braided body and substrate are difficult to combine.

Term Description (Ti, W) C/Mo Co Ni: shorthand for composite matrix cermet tool material added to tungsten carbide titanium with molybdenum, cobalt and nickel as bonding phases.

The technical solution of the present invention is as follows:

The utility model relates to a laminated cermet tool material with self-generated micro-texture, including a tool matrix. The upper and lower surfaces of the tool matrix are provided with a 2.5D braided ceramic fiber reinforcement layer, and the thickness of the 2.5D braided ceramic fiber reinforcement layer is 0.8 mm-1.2 mm. The surface of the upper and lower 2.5D braided ceramic fiber reinforcement layer is provided with self-generated micro-raised texture. A laminated cermet tool with 2.5D braided ceramic fiber reinforced layer and self-generated micro-raised texture is arranged on both sides of the basic forming tool.

According to the invention, the thickness of the 2.5D braided ceramic fiber reinforcement layer is 0.8-1 mm, which is in close contact with the surface of the cermet tool base.

The most preferred thickness of the 2.5D braided ceramic fiber reinforcement layer is 1 mm.

According to the preferred method of the present invention, the volume percentage content of each component of the tool matrix is Co 1-7%, Mo 2.5-10.5%, Ni 1.5-7.5%, and (Ti,W) C 75-95%.

The preparation method of the laminated cermet tool material with self-generated micro texture on the surface comprises the steps of:
(1) Add polyethylene glycol to anhydrous ethanol, stir with magnetic force under constant temperature conditions in a water bath, cool to room temperature, and prepare a polyethylene glycol anhydrous ethanol dispersion;

(2) Add metal phase to tungsten carbide titanium (Ti,W) C powder to obtain a mixed powder. Disperse the mixed powder in anhydrous ethanol and mix evenly to obtain a mixture. Add polyethylene glycol anhydrous ethanol dispersion to the mixture, mechanically stir and sonicate for 45-60 minutes to prepare (Ti,W) C/Mo Co Ni composite solution;

(3) Ball milling the (Ti,W) C/Mo Co Ni composite solution prepared in step (2) under nitrogen protection atmosphere for 48-60 hours to prepare ball milling slurry;

(4) Vacuum drying and sieving the ball milling slurry in step (3) to obtain a metal ceramic composite powder;

(5) The 2.5D braided ceramic fiber preform and the cermet matrix powder in step (4) are placed in a graphite mold, and then spark plasma sintering is carried out to prepare a laminated cermet tool material with self-generated micro texture on the surface.

According to the preferred method of the present invention, in step (1), the magnetic stirring time is 15-20 minutes, and the constant temperature of the water bath is 55-65° C.

According to the preferred method of the present invention, in step (1), the mass of the polyethylene glycol in the anhydrous ethanol polyethylene glycol dispersion is 1-5% of the mass of the (Ti,W) C composite powder.

According to the preferred method of the present invention, in step (1), the volume ratio of polyethylene glycol to anhydrous ethanol is 1: (8-12).

According to the preferred method of the present invention, in step (1), the molecular weight of polyethylene glycol is 2000-10000.

The most preferred method in step (1) is polyethylene glycol with a molecular weight of 6000.

According to the preferred method of the present invention, in step (2), the condition for dispersing the mixed powder in anhydrous ethanol is mechanical stirring and ultrasonic dispersion for 45-60 minutes, with a volume ratio of 1:(8-12) between the mixed powder and anhydrous ethanol.

According to the preferred method of the present invention, in step (2), the average particle size of tungsten titanium carbide (Ti, W) C powder is 1-3 μm, and further preferred, the average particle size of tungsten titanium carbide (Ti, W) C powder is 1-1.5 μm.

According to the preferred method of the present invention, in step (2), the metal phase is Co, Ni, Mo, and the total volume of Co, Ni, Mo is 6-19% by volume of the mixed powder.

The most preferred method is that the total volume of Co, Ni, and Mo is 15% by volume of the mixed powder.

According to the preferred method of the present invention, in step (2), the volume ratio of Co, Ni, and Mo is (3-6):(2.5-2.5):(4.5-8.5).

According to the preferred method of the present invention, in step (2), the average particle size of Co is 1-3 inn, and further preferred, the average particle size of Co is 1-1.5 μm.

According to the preferred method of the present invention, in step (2), the average particle size of Ni is 1-3 inn, and further preferred, the average particle size of Ni is 1-1.5 μm.

According to the preferred method of the present invention, in step (2), the average particle size of Mo is 1-3 inn, and further preferred, the average particle size of Mo is 1-1.5 μm.

According to the preferred method of the present invention, in step (3), the grinding ball during ball milling is a hard alloy grinding ball, with a ball material mass ratio of 10-20:1.

Hard alloy grinding balls are carried out according to existing technology.

According to the preferred method of the present invention, in step (4), vacuum drying is carried out under conditions of 100-120° C. for 24-36 hours, with a sieving mesh of 100-200 mesh.

According to the preferred method of the present invention, in step (5), when placed, the 2.5D braided ceramic fiber preforms are respectively located on the upper and lower surfaces of the metal ceramic matrix powder.

According to the preferred method of the present invention, in step (5), the 2.5D braided ceramic fiber preform is obtained by weaving ceramic fibers, the ceramic fiber structure is a shallow cross bending structure, and the fiber diameter is 8-15 μm. Single wire diameter 13.6 μm. The tensile strength is 2.8 GPa, the tensile modulus is 315.0 GPa, and the fracture strain is 0.9%.

According to the preferred method of the present invention, in step (5), the ceramic fiber is a second-generation SiC fiber with a fiber diameter of 10-15 microns.

Furthermore, in step (5), the fiber diameter is 14 microns.

According to the preferred method of the present invention, in step (5), the discharge plasma sintering conditions are: sintering temperature 1350-1550° C., sintering pressure 30-35 MPa, heating rate 100-150° C./min, and holding time 8-10 minutes.

The 2.5D braided ceramic fiber preform of the present invention is a commercially available braided ceramic fiber preform.

The methods described in the present invention, which are not specifically limited, can all be based on the prior art.

In the invention, 2.5D braided ceramic fiber preforms are placed on the upper and lower surfaces of the cermet matrix powder, and through spark plasma sintering, a laminated cermet tool material with self generated micro texture on the surface is obtained, During sintering, the metal phase overflows and fills the bottom of the fibers, combining with the substrate to form a layer, while the gaps between the surface fibers are not filled with the metal phase, forming a texture.

The technical features and advantages of the present invention:

1. In the invention, firstly, molybdenum cobalt nickel rare metal is added into the tungsten carbide titanium matrix powder as the bonding phase to make the matrix, then 2.5D braided ceramic fiber preforms are placed on the upper and lower surfaces of the cermet matrix powder, and then through spark plasma sintering, a laminated cermet tool material with self generated micro texture on the surface is obtained. Since the ceramic fiber braid is braided, it has a stable structure, The laminated tool with texture coating formed on the surface layer of the tool and cermet as the intermediate layer is realized. The tool material has excellent mechanical properties and self generated texture on the surface layer, which overcomes the problem of insufficient strength of cermet tools.

2. In the invention, 2.5D braided ceramic fiber preforms are placed on the upper and lower surfaces of the cermet matrix powder, and the laminated cermet tool material with self generated micro texture on the surface is obtained by spark plasma sintering, realizing a new laminated structure with self generated micro texture on the surface layer of the tool and cermet in the middle. On the one hand, the tool forms micro texture on the surface layer, and the preparation method is simple, with low cost, On the other hand, it has the characteristics of traditional cermet tools. The surface layer is a ceramic layer, and its hardness, red hardness, wear resistance, chemical stability, oxidation resistance, etc. are superior to hard alloy. The middle layer is a cermet, which also solves the disadvantages of high brittleness, low transverse fracture strength, and poor ability to withstand impact loads. Cutting tests show that the laminated cermet tool material of the invention has high hardness, high toughness, and good tool life, And the surface roughness of the processed workpiece is low, and the friction coefficient of the tool front face is significantly reduced during processing.

3. The laminated cermet tool material of the invention has excellent mechanical properties. When the content of molybdenum is 6.5%, cobalt is 5%, and nickel is 3.5%, the mechanical properties are optimal when sintering temperature is 1400° C. and holding time is 10 minutes. The bending strength, hardness, and fracture toughness of the tool are 1351.2 MPa, 19.3 GPa, and 10.85 MPa·m$^{1/2}$, respectively. The average width of surface texture is 9.79 μm. The average depth is 10.21 μm.

DETAILED DESCRIPTION OF THE PREFERRED EMBODIMENTS

The present invention will be further elaborated on in conjunction with specific embodiments, but it is not limited to the following embodiments.

In the implementation example, the 2.5D braided ceramic fiber preform is obtained by weaving ceramic fibers, which is a 2.5D braided silicon carbide ceramic fiber preform with a fiber diameter of 14 microns and a thickness of 0.8-1 millimeters. It is a commercially available product.

Example 1

The utility model relates to a laminated cermet tool material with self-generated micro-texture, including a tool substrate, on which a 2.5D braided ceramic fiber reinforcement layer is arranged on the upper and lower surfaces of the tool substrate, and the thickness of the 2.5D braided ceramic fiber reinforcement layer is 0.8 mm. The surface of the upper and lower 2.5D braided ceramic fiber reinforcement layer has self-generated micro-raised texture. A laminated cermet tool with 2.5D braided ceramic fiber reinforced layer and self-generated micro-raised texture is arranged on both sides of the basic forming tool.

The preparation method is as follows:
(1) The polyethylene glycol with the mass of (Ti,W)C composite powder was added to anhydrous ethanol. The volume ratio of polyethylene glycol to anhydrous ethanol was 1:10. Under the condition of constant temperature of water bath, the magnetic stirring and cooling to room temperature were used to prepare the polyethylene glycol-anhydrous ethanol dispersing solution.

(2) The mixed powder was prepared, which consisted of 2.5% nickel with an average particle size of 1 μm, 4.5% molybdenum with an average particle size of 1 μm, 3% cobalt with an average particle size of 1 μm, and the rest was (Ti,W)C with an average particle size of 1 μm. The mixed powder was dispersed in anhydrous ethanol, and the volume ratio of the mixed powder to anhydrous ethanol was 1:10. (Ti,W)C/Mo—Co—Ni composite solution was prepared by adding polyethylene glycol-anhydrous ethanol dispersion into the mixture, stirring mechanically and dispersing ultrasonic for 45 min respectively.

Figure 1:
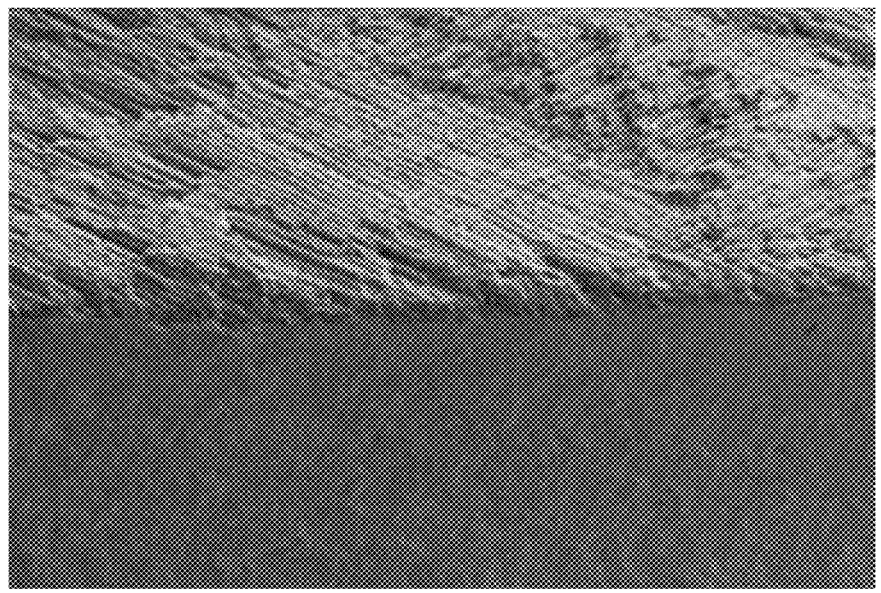
FIG. 1 shows the photos of the surface layer of the laminated cermet tool with self generated micro texture.
Figure 2:
FIG. 2 shows the photos of surface micro texture of the laminated cermet tool with self generated micro texture.

(3) Ball milling the (Ti, W) C/Mo Co Ni composite solution prepared in step (2) under nitrogen protection atmosphere for 48 hours, with a ball material mass ratio of 10:1, to obtain a ball milling slurry;

(4) Place the ball milled slurry in step (3) in a drying oven and vacuum dry it at 110° C. for 24 hours. After drying, filter the mixed powder with a 100 mesh sieve to obtain the metal ceramic composite powder;

(5) Cut the 2.5D braided ceramic fiber preform to a suitable size, cover it with the bottom of the graphite mold, and load the metal ceramic matrix powder on top. Add a layer of 2.5D braided ceramic fiber cloth of the same size on top of the metal ceramic matrix powder, and the 2.5D braided ceramic fiber cloth tightly adheres to the metal ceramic matrix powder. Conduct spark plasma sintering. The sintering conditions are as follows: sintering temperature 1375° C., pressure 30 MPa, heating rate 100° C./min, holding time 10 min, that is, the laminated cermet tool material with self generated micro texture on the surface is obtained. The photo of the surface layer and surface micro texture of the laminated cermet tool with self generated micro texture on the surface is shown in FIG. 1.

The ceramic splines of 3 mm×4 mm×30 mm were prepared by the steps of cutting, rough grinding, fine grinding, grinding and polishing, and the mechanical properties were measured as follows: hardness 18.5 GPa, fracture toughness 9.34 MPa·m$^{1/2}$, bending strength 1271.4 MPa. The thickness of the fiber layer formed on the surface is 0.3 mm, the average width of the surface texture is 9.42 μm, and the average depth is 9.88 μm.

Example 2

A laminated cermet tool material with self generated micro texture on the surface, including a tool matrix, the upper and lower surfaces of the tool matrix are provided with 2.5D braided ceramic fiber reinforcement layers, the thickness of the 2.5D braided ceramic fiber reinforcement layer is 1 mm, the surface of the upper and lower 2.5D braided ceramic fiber reinforcement layers is provided with self generated micro convex texture, and the basic two sides of the tool are provided with 2.5D braided ceramic fiber reinforcement layers Laminated cermet tool with self generated micro bulge texture.

The preparation method is as follows:
(1) Add 1% polyethylene glycol with a mass of (Ti, W) C composite powder to anhydrous ethanol, with a volume ratio of 1:10 between polyethylene glycol and anhydrous ethanol. Stir magnetically under constant temperature water bath conditions and cool to room temperature to prepare a polyethylene glycol anhydrous ethanol dispersion;

(2) Prepare a mixed powder with an average particle size of 1 by volume percentage μ 3.5% nickel with an average particle size of 1μ 6.5% molybdenum with an average particle size of 1μ 5% cobalt in m, with the rest having an average particle size of 1μ (Ti, W) C of m was dispersed in anhydrous ethanol, and the volume ratio of the mixed powder to anhydrous ethanol was 1:10. The mixture was uniformly mixed, and polyethylene glycol anhydrous ethanol dispersion was added to the mixture. Mechanical stirring and ultrasonic dispersion were performed for 45 minutes to prepare (Ti, W) C/Mo Co Ni composite solution;

(3) Ball milling the (Ti, W) C/Mo Co Ni composite solution prepared in step (2) under nitrogen protection atmosphere for 48 hours, with a ball material mass ratio of 10:1, to obtain a ball milling slurry;

(4) Place the ball milled slurry in step (3) in a drying oven and vacuum dry it at 110° C. for 24 hours. After drying, filter the mixed powder with a 100 mesh sieve to obtain the metal ceramic composite powder;

(5) Cut the 2.5D braided ceramic fiber preform to a suitable size, cover it with the bottom of the graphite mold, and load the metal ceramic matrix powder on top. Add a layer of 2.5D braided ceramic fiber cloth of the same size on top of the metal ceramic matrix powder, and the 2.5D braided ceramic fiber cloth tightly adheres to the metal ceramic matrix powder. Conduct spark plasma sintering. The sintering conditions are as follows: sintering temperature 1400° C., pressure heating rate 100° C./min, holding time 10 min, and then the laminated cermet tool material with self generated micro texture on the surface is obtained.

The ceramic splines of 3 mm×4 mm×30 mm were prepared by the steps of cutting, rough grinding, fine grinding, grinding and polishing. The mechanical properties of the ceramic splines were measured as follows: hardness 19.3 GPa, fracture toughness 10.85 MPa·m$^{1/2}$ and bending strength 1351.2 MPa. The thickness of the fiber layer formed on the surface is 0.5 mm, the average width of the surface texture is 9.79 μm, and the average depth is 10.21 μm.

Example 3

A laminated cermet tool material with self generated micro texture on the surface, including a tool matrix, the upper and lower surfaces of the tool matrix are provided with 2.5D braided ceramic fiber reinforcement layers, the thickness of the 2.5D braided ceramic fiber reinforcement layer is 1.2 mm, the surface of the upper and lower 2.5D braided ceramic fiber reinforcement layers is provided with self generated micro convex texture, and the basic two sides of the tool are provided with 2.5D braided ceramic fiber reinforcement layers Laminated cermet tool with self generated micro bulge texture.

The preparation method is as follows:

(1) Add 1% polyethylene glycol with a mass of (Ti, W) C composite powder to anhydrous ethanol, with a volume ratio of 1:10 between polyethylene glycol and anhydrous ethanol. Stir magnetically under constant temperature water bath conditions and cool to room temperature to prepare a polyethylene glycol anhydrous ethanol dispersion;

(2) Prepare a mixed powder with an average particle size of 1 by volume percentage μ 5.5% nickel with an average particle size of 1μ 8.5% molybdenum with an average particle size of 1μ Cobalt of m is 6%, while the rest have an average particle size of 1μ (Ti, W) C of m was dispersed in anhydrous ethanol, and the volume ratio of the mixed powder to anhydrous ethanol was 1:10. The mixture was uniformly mixed, and polyethylene glycol anhydrous ethanol dispersion was added to the mixture. Mechanical stirring and ultrasonic dispersion were performed for 45 minutes to prepare (Ti, W) C/Mo Co Ni composite solution;

(3) Ball milling the (Ti, W) C/Mo Co Ni composite solution prepared in step (2) under nitrogen protection atmosphere for 48 hours, with a ball material mass ratio of 10:1, to obtain a ball milling slurry;

(4) Place the ball milled slurry in step (3) in a drying oven and vacuum dry it at 110° C. for 24 hours. After drying, filter the mixed powder with a 100 mesh sieve to obtain the metal ceramic composite powder;

(5) Cut the 2.5D braided ceramic fiber preform to a suitable size, cover it with the bottom of the graphite mold, and load the metal ceramic matrix powder on top. Add a layer of 2.5D braided ceramic fiber cloth of the same size on top of the metal ceramic matrix powder, and the 2.5D braided ceramic fiber cloth tightly adheres to the metal ceramic matrix powder. Conduct spark plasma sintering. The sintering conditions are as follows: sintering temperature 1425° C., pressure heating rate 100° C./min, holding time 10 min, and then the laminated cermet tool material with self generated micro texture on the surface is obtained.

The laminated cermet tool material is prepared to 3 mm through the steps of cutting-coarse grinding-fine grinding-grinding-polishing×4 mm×The mechanical properties of 30 mm ceramic spline are: hardness 20.22 GPa, fracture toughness 9.83 MPa·m$^{1/2}$, bending strength 1150.4 MPa. The thickness of the fiber layer formed on the surface is 0.7 mm, and the average width of the surface texture is 10.11 μm. The average depth is 10.67 μm.

Comparative Example 1

The difference between the laminated cermet tool material with self generated micro texture on the surface as described in Example 1 is that:

The thickness of the 2.5D braided ceramic fiber reinforcement layer is 0.8 mm;

When preparing mixed powder, the average particle size is 1, calculated by volume percentage content μ 1.5% nickel with an average particle size of 1μ 2.5% molybdenum with an average particle size of 1μ Cobalt of m is 1%, while the rest have an average particle size of 1μ (Ti, W) C of m; For others, follow Example 1.

The ceramic splines of 3 mm×4 mm×30 mm were prepared by the steps of cutting, rough grinding, fine grinding, grinding and polishing. The mechanical properties were measured as follows: hardness 16.51 GPa, fracture toughness 8.71 MPa·m$^{1/2}$ and bending strength 1145.2 MPa. However, due to the lack of metal, the fiber layer can not effectively combine with the matrix, and the fiber layer can not be shed to generate micro-texture on the surface of cermet tool.

Comparative Example 2

The difference between the laminated cermet tool material with self generated micro texture on the surface as described in Example 1 is that:

The thickness of the 2.5D braided ceramic fiber reinforcement layer is 1 mm;

When preparing mixed powder, the average particle size is 1, calculated by volume percentage content μ 7.5% nickel with an average particle size of 1μ 10.5% molybdenum with an average particle size of 1μ Cobalt content of m is 7%, while the rest has an average particle size of 1μ (Ti, W) C of m; For others, follow Example 1.

The ceramic splines of 3 mm×4 mm×30 mm were prepared by the steps of cutting, rough grinding, fine grinding, grinding and polishing. The mechanical properties of the ceramic splines were measured as follows: hardness 19.1 GPa, fracture toughness 9.64 MPa·m$^{1/2}$ and bending strength 1021.5 MPa. However, due to the excessive metal phase, it is impossible to form texture on the surface by covering all the fiber layers.

Contrast Example 3 with Cermet Tool Materials without Fiber Reinforced Layers

Steps (1), (2), (3), and (4) shall be carried out according to Example 1;

Step (5) The cermet composite powder is loaded into the mold made of graphite for spark plasma sintering. The sintering temperature is 1400° C., the pressure is 30 MPa, the heating rate is 100° C./min, and the holding time is 10 min, so that the cermet tool material is obtained.

The tool material was prepared into 3 mm×4 mm×30 mm ceramic spline by cutting, rough grinding, fine grinding, grinding and polishing. The mechanical properties were measured as follows: hardness 16.56 GPa, fracture toughness 7.21 MPa·m$^{1/2}$, bending strength 955 Mpa, and no texture on the surface.

What is claimed is:

1. A laminated metal-ceramic tool material with a self-generating micro-weave structure on a surface, comprising a tool base, the tool base with a 2.5D woven ceramic fiber reinforcement layer provided on upper and lower surfaces of the 2.5D woven ceramic fiber reinforcement layer having a thickness of 0.8 mm-1.2 mm, a self-generating micro-bump weave structure on the surface of the upper and lower of the surfaces of the 2.5D woven ceramic fiber reinforcement layer, a laminated metal-ceramic tool with the 2.5D woven ceramic fiber reinforcement layer and the self-generating micro-bump weave structure provided on both sides of the tool base to form the tool; the 2.5D woven ceramic fiber reinforcement layer, and the laminated metal-ceramic tool with the self-generating micro-weave structure, was obtained by the following steps:

(1) adding polyethylene glycol to anhydrous ethanol, stirred magnetically at constant temperature in a water bath and cooled to room temperature to produce polyethylene glycol-anhydrous ethanol dispersion;

(2) adding metal phases to titanium (Ti,W)C carbide powder to obtain a mixed powder, dispersing the mixed powder in anhydrous ethanol and mix well to obtain the mixture, adding the polyethylene glycol-anhydrous ethanol dispersion to the mixture and mechanically stir and ultrasonically disperse for 45-60 min respectively to produce a (Ti,W)C—Mo—Co—Ni composite solution, wherein the metal phase comprises Co, Ni and Mo;

(3) ball-milling the (Ti,W)C—Mo—Co—Ni composite solution produced in step (2) under nitrogen-protected atmosphere for 48~60 h to produce a ball-milled slurry;

(4) vacuum drying and sieving the ball-milled slurry from step (3) to obtain the metal-ceramic composite powder; and (5) placing 2.5D woven ceramic fiber preforms with the cermet matrix powder from step (4) in a graphite mold and perform electrical discharge plasma sintering to produce the laminated cermet tool material with the self-generated micro-weave structure on the surface; when placed, the 2.5D woven ceramic fiber preform are located on the upper and lower surfaces of the cermet matrix powder, the 2.5D woven ceramic fiber preforms are obtained by weaving ceramic fibers, the ceramic fiber structure is a shallow cross bending joint structure, the fiber diameter is 8-15 μm, the monofilament diameter is 13.6 μm, the tensile strength is 2.8 GPa, the tensile modulus is 315.0 GPa, the fracture strain is 0.9% ceramic fibers of second generation SiC fibers with a fiber diameter of 10-15 μm;

the discharge plasma sintering conditions are: sintering temperature 1350-1550° C., sintering pressure 30-35 MPa, heating rate 100-150° C./min, holding time 8-10 min.

2. The laminated metal-ceramic tool material according to claim 1, wherein the 2.5D woven ceramic fiber reinforcement layer has a thickness of 0.8-1 mm and is in close contact with the surface of the metal-ceramic tool substrate.

3. The laminated metal-ceramic tool material according to claim 1, wherein the volume percentages of each component of said tool material are: Co 1-7%, Mo 2.5-10.5%, Ni 1.5-7.5%, and (Ti,W)C 75-95%.

4. The laminated metal-ceramic tool material to claim 1, wherein in step (1), the magnetic stirring time is 15-20 min, the water bath constant temperature is 55-65° C., the anhydrous ethanol-polyethylene glycol dispersion, the mass of said polyethylene glycol is 1-5% of the mass of the (Ti,W)C composite powder, the volume of polyethylene glycol to anhydrous ethanol ratio is 1:(8-12), and the molecular weight of polyethylene glycol is 2000~10000.

5. The laminated metal-ceramic tool material according to claim 1, wherein in step (2), the mixed powder is dispersed in anhydrous ethanol under the conditions of mechanical stirring and ultrasonic dispersion for 45-60 min, and the volume ratio of the mixed powder to anhydrous ethanol is 1:(8-12).

6. The laminated metal-ceramic tool material according to claim 1, wherein in step (2), the average particle size of titanium tungsten carbide (Ti,W)C powder is 1 to 3 μm, the total volume of the metal phase is 6-19% by volume of the mixed powder, and the volume ratio of Co, Ni, Mo is (3-6): (2.5-2.5): (4.5-8.5).

7. The laminated metal-ceramic tool material according to claim 1, wherein in step (2), the average particle size of Co is 1~3 μm, the average particle size of Ni is 1~3 μm, and the average particle size of Mo is 1~3 μm, and in step (3), the grinding ball is a cemented carbide grinding ball with a ball mass ratio of 10~20:1, and in step (4), the vacuum drying is at 100~120° C. for 24~36 h, and the sieve mesh is 100~200 mesh.

* * * * *